(12) United States Patent
Ranade et al.

(10) Patent No.: US 9,643,343 B2
(45) Date of Patent: May 9, 2017

(54) METHOD FOR MOLDING RECYCLED EPS USING POWDER ADHESIVE AND STEAM

(71) Applicant: SONOCO DEVELOPMENT, INC., Hartsville, SC (US)

(72) Inventors: Ajit Ranade, Naperville, IL (US); Kate Piscopo, Bedford, NH (US)

(73) Assignee: Sonoco Development, Inc., Hartsville, SC (US)

( * ) Notice: Subject to any disclaimer, the term of this patent is extended or adjusted under 35 U.S.C. 154(b) by 90 days.

(21) Appl. No.: 14/775,273

(22) PCT Filed: Mar. 11, 2014

(86) PCT No.: PCT/US2014/023190
§ 371 (c)(1),
(2) Date: Sep. 11, 2015

(87) PCT Pub. No.: WO2014/164676
PCT Pub. Date: Oct. 9, 2014

(65) Prior Publication Data
US 2016/0023379 A1    Jan. 28, 2016

Related U.S. Application Data

(60) Provisional application No. 61/776,180, filed on Mar. 11, 2013.

(51) Int. Cl.
C08J 9/33        (2006.01)
B29B 17/00      (2006.01)
(Continued)

(52) U.S. Cl.
CPC ........ B29C 35/049 (2013.01); B29B 17/0036 (2013.01); B29C 35/16 (2013.01);
(Continued)

(58) Field of Classification Search
None
See application file for complete search history.

(56) References Cited

U.S. PATENT DOCUMENTS 3,790,422 A * 2/1974 Jourquin ............... C08J 9/33
                                                                 156/307.1
4,312,957 A    1/1982 Spicuzza, Jr.
(Continued)

FOREIGN PATENT DOCUMENTS

EP    2428532 A2    3/2012
EP    2488433 A1    8/2012

OTHER PUBLICATIONS

International Search Report and Written Opinion for related Application No. PCT/US2014/023190 report dated Jul. 28, 2014.
(Continued)

Primary Examiner — Mary F Theisen
(74) Attorney, Agent, or Firm — Miller, Matthias & Hull LLP

(57) ABSTRACT

A method is provided of molding recycled EPS and other suitable expanded bead materials using a powder adhesive and steam. The method allows for molding EPS parts with over 5% and up to 100% recycled content. The method involves using an adhesive to fuse the regrind EPS particles under pressure from steam. The adhesive may be in powder form and preferably comprises small particles having a high surface area per unit weight and high static so the adhesive powder sticks to the surface of the regrind EPS particles during a dry blending step.

16 Claims, 5 Drawing Sheets

(51) Int. Cl.
*B29C 67/20* (2006.01)
*B29C 43/02* (2006.01)
*B29C 44/44* (2006.01)
*B29C 35/04* (2006.01)
*C08J 9/236* (2006.01)
*B29C 35/16* (2006.01)
*B29K 105/04* (2006.01)
*B29K 25/00* (2006.01)
*B29K 105/26* (2006.01)

(52) U.S. Cl.
CPC ............... *B29C 67/20* (2013.01); *C08J 9/236* (2013.01); *C08J 9/33* (2013.01); *B29C 2035/1616* (2013.01); *B29K 2025/06* (2013.01); *B29K 2105/048* (2013.01); *B29K 2105/26* (2013.01); *C08J 2300/30* (2013.01); *C08J 2323/06* (2013.01); *C08J 2325/06* (2013.01); *Y02W 30/62* (2015.05)

(56) References Cited

U.S. PATENT DOCUMENTS

| | | | |
|---|---|---|---|
| 4,456,443 A | 6/1984 | Rabotski | |
| 4,666,646 A * | 5/1987 | Chang | B29B 17/0026 264/109 |
| 5,034,167 A * | 7/1991 | Masters | B29B 13/00 264/126 |
| 5,185,380 A * | 2/1993 | Diessel | B29B 17/0042 264/115 |
| 5,330,596 A | 7/1994 | Gusavage et al. | |
| 5,525,278 A | 6/1996 | Krosch et al. | |
| 5,610,207 A | 3/1997 | De Simone et al. | |
| 5,800,658 A | 9/1998 | Gustafsson et al. | |
| 5,830,305 A | 11/1998 | Andersen et al. | |
| 7,901,603 B1 | 3/2011 | Beholz | |
| 2006/0251881 A1* | 11/2006 | Gilder | C08J 9/33 428/317.1 |
| 2007/0085231 A1 | 4/2007 | Menges et al. | |
| 2012/0237734 A1 | 9/2012 | Maurer et al. | |

OTHER PUBLICATIONS

Lye, S. W. et al. "Adhesives for bead fusion of recycled expandable polystyrene". Journal of Applied Polymer Science, vol. 86, Issue 2, pp. 456-462, Oct. 10, 2002.

Lye, S. W. et al. "Powder adhesive moulding of recycled expandable polystyrene". 2003 IoM Communications Ltd. Published by Maney for the Institute of Material, Minerals and Mining, S. W. Lye and H. D. Aw are at Nanyang Technological University, Nanyang Avenue, Singapore 639798. Manuscript received May 15, 2003, accepted in final form Nov. 14, 2003. Plastics, Rubber and Composites 2003, vol. 32, Issue No. 8-9, Oct. 2003, pp. 368-376.

\* cited by examiner

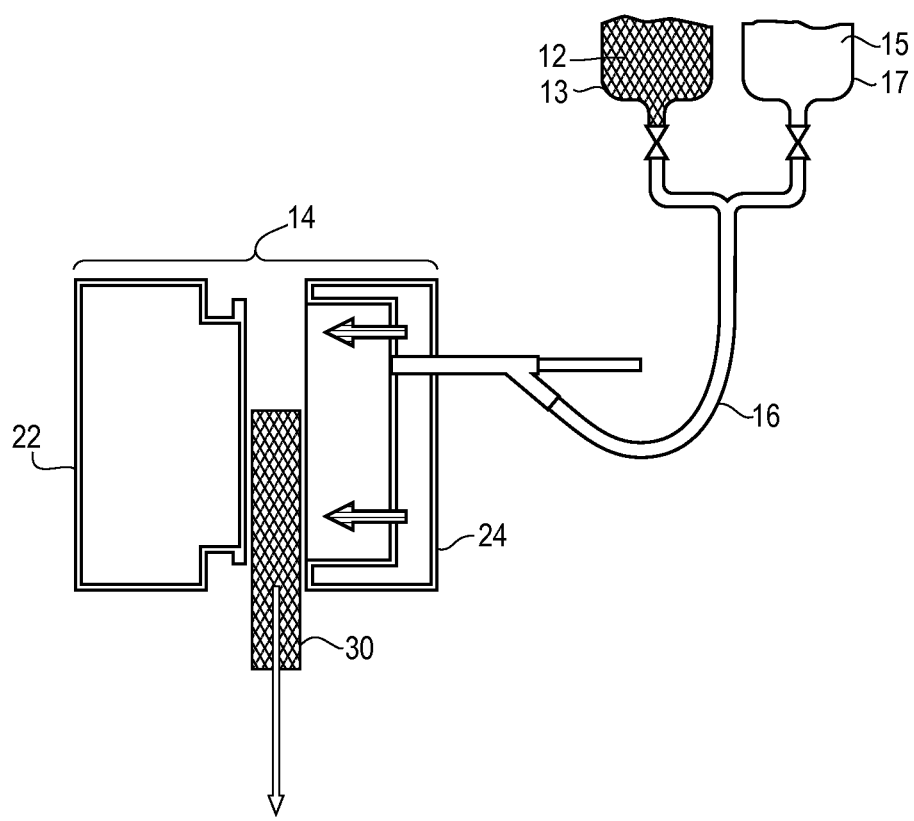

METHOD FOR MOLDING RECYCLED EPS USING POWDER ADHESIVE AND STEAM

BACKGROUND OF THE INVENTION

Field of the Invention

This invention patent relates to a method for reusing expanded bead materials. More particularly, this invention relates to a method for molding expanded polystyrene foam regrind material using a powder adhesive and steam.

Description of the Related Art

Expanded polystyrene (EPS) foam has found popular use as insulation and in packaging materials. EPS beads are produced by injecting pentane (a blowing agent) in tiny polystyrene granules (a.k.a. virgin EPS beads). This process is called primary expansion. The spherical EPS beads are expanded to about 40 times their size by heating polystyrene beads using steam which makes the pentane boil. This process is called secondary expansion. The pentane gas expands under the action of heat, producing a honeycomb-like cell structure. These virgin expanded beads are molded into a three dimensional objects using a machine called steam chest molding machine. During steam chest molding, steam and pressure is applied which causes EPS beads to fuse together. Presence of pentane is extremely critical to the fusion as it is the primary driving force for the fusion. During molding, virgin EPS beads still has less than 2% of pentane trapped in its cell structure. Pentane is a volatile gas under atmospheric conditions and typically EPS beads are molded within 2-3 weeks of secondary expansion. If too much time passes then the beads are "dead" and have no use for the molding. Under heat (steam) and pressure, the pentane gas creates a lot of heat, thus taking the polystyrene above its glass transition temperature of 85 C. Above the glass transition temperature the polystyrene chains are soft and thus bond to create a three dimensional product. A lack of pentane will not raise the temperature beyond 85 C and thus not create any fusion.

Polystyrene is a petroleum-based, non-biodegradable polymer that occupies large volumes of space in landfills and remains there for very long periods of time. Each year large amounts of expanded polystyrene waste are added to landfills across the globe. Due to its adverse environmental impact, some jurisdictions have banned the use of EPS for food packaging.

A method of recycling EPS would help alleviate this problem. Currently, EPS manufacturers are unable to use recycled EPS back in their product since the recycled beads contain no residual pentane. Addition of "dead" EPS beads creates an inferior product with a substantial loss of physical properties.

EPS packaging is used in high quantities to protect big electronic items such as televisions, appliances, printers and other electronic items. These items are fragile and breakage creates recycling problems because electronic items are expensive to recycle. EPS molders are reluctant to reuse recycled EPS since the addition of recycled EPS has a negative impact on the EPS properties.

Thus there is a need for a more efficient system for reusing EPS that would increase the life cycle of each molded bead, increase the amount of recycled EPS that can be used in a molded EPS part, decrease the use of raw materials by the EPS industry and decrease the amount of EPS sent to landfills.

The present invention is designed to meet these needs.

BRIEF SUMMARY OF THE INVENTION

The present invention is a method of making a molded article from recycled expanded bead foam regrind particles such as expanded polystyrene (EPS). The method may comprise the steps of:

Step 100: mixing about 95 wt % to about 99.9 wt % EPS regrind particles with about 0.1 wt % to about 5 wt % (and preferably less than about 3.5 wt %) of a high static powder adhesive in a dry blend rotating mixer to obtain adhesive coated EPS regrind particles;

Step 102: transferring the adhesive-coated EPS regrind particles to a mold, preferably using air from an air-pressurized fill gun;

Step 104: bonding the adhesive-coated regrind particles together under pressure by introducing a small quantity of pressurized steam into the mold to raise the temperature of the powder adhesive above its melting point so that the powder adhesive melts to create bonded regrind particles; and Step 106: cooling the bonded regrind particles in the mold, preferably for about two minutes, thereby producing a molded article having an adhesive coated regrind EPS particle content of at least 5% and up to 100%.

The expanded bead foam regrind particles may be made of expanded polystyrene, expanded polyethylene or any suitable expanded foam bead material. The adhesive may be thermographic powder.

Before step 102 the adhesive-coated expanded bead foam regrind particles may be mixed with virgin expanded beads. More specifically, the adhesive-coated expanded bead foam regrind particles may be mixed with virgin expanded beads in a ratio of at least 5 wt % expanded bead foam regrind particles to at most 95 wt % virgin expanded beads.

BRIEF DESCRIPTION OF THE DRAWINGS

FIGS. 2 to 7 are diagrams of an apparatus for use with the present invention;

FIG. 2 shows the mixing step;
FIG. 3 shows the filling step;
FIG. 4 shows the bonding step;
FIG. 5 shows the bonding step;
FIG. 6 shows the cooling step; and
FIG. 7 shows the ejection step.

DETAILED DESCRIPTION OF THE INVENTION

Figure 1:
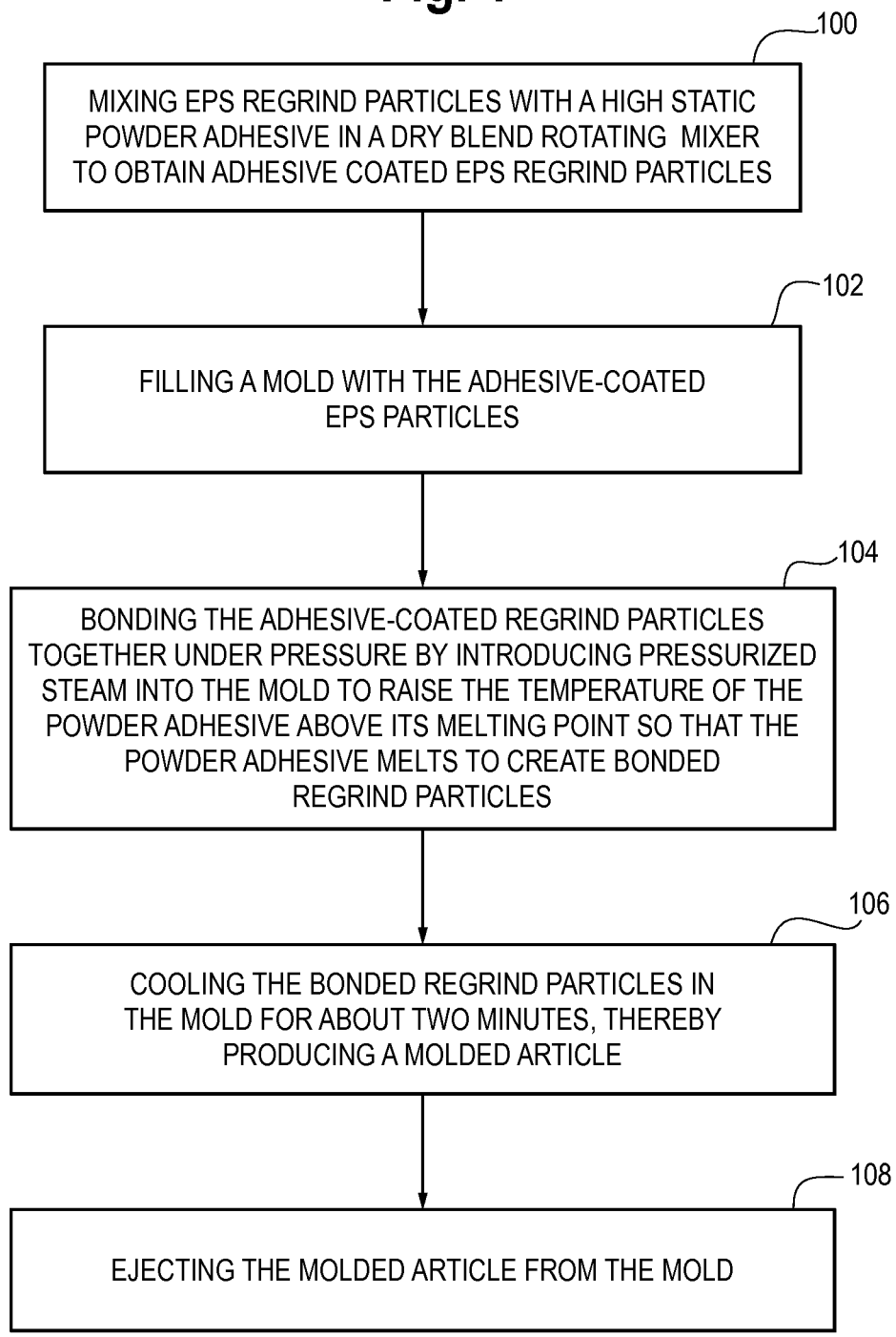
FIG. 1 is a flow chart showing a method of molding expanded polystyrene foam regrind material using a powder adhesive and steam according to the disclosure.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

The present invention is a method of molding recycled EPS using a powder adhesive and steam. The method may be used with EPS and other suitable expanded bead materials such as expanded polypropylene, expanded polyethylene (PE) and other expanded bead foams. The method may allow for molding EPS parts with over 5% and up to 100% recycled content. The process involves using an adhesive to fuse the EPS beads rather than only heat and pressure from steam. The molding temperature should be about 60 C or higher so the power adhesive becomes sticky, and curing should start at about 70 C or higher. Preferably about 0.1 to about 10% of the adhesive additive may be required to obtain fusion of the beads.

The adhesive may be in powder form and preferably comprises small particles having a high surface area per unit weight and high static so the adhesive powder sticks to the surface of the regrind EPS particles during dry blending.

One suitable adhesive powder is a commercially available thermographic powder used in the paper industry. The powder coats the EPS regrind particles due to its electrical charge as well as the micropores found on the surface of the EPS particles. Interestingly, thermographic powder appears to work better than industrial adhesives.

Referring to FIG. 1, in one embodiment the method comprises the following steps:

(Step 100) Mixing about 95 wt % to about 99.9 wt % EPS regrind particles 6 with about 0.1 wt % to about 10 wt % (and preferably less than about 3.5 wt %) of a high static powder adhesive 8 in a dry blend rotating mixer 10 to obtain adhesive coated EPS regrind particles 12. From about 0.1% to about 10% of optional additives may also be added to the mixture.

(Step 102) Transferring the adhesive-coated EPS regrind particles 12 to a mold 14, such as by using air from an air-pressurized fill gun. The adhesive-coated EPS particles 12 may be transferred in a convection pipe 16. Optionally, the adhesive coated EPS regrind particles 12 may be mixed with virgin EPS beads 15 before transferring the bead mixture to the mold 14.

(Step 104) Bonding the adhesive-coated regrind particles 12 together under pressure by introducing a small quantity of pressurized steam 20 into the mold 14 to raise the temperature of the powder adhesive 8 above its melting point so that the powder adhesive 8 melts to create bonded regrind particles. The mold temperature should be above about 60 degrees C. or even 70 degrees C. but below the melting point of EPS (about 120 degrees C.).

(Step 106) Cooling the bonded regrind particles in the mold 14 for about two minutes, thereby producing a molded article 30 having a recycled EPS content of over 5 wt % and up to 100 wt %.

(Step 108) Ejecting the molded article 30 from the mold 14.

Figure 2:
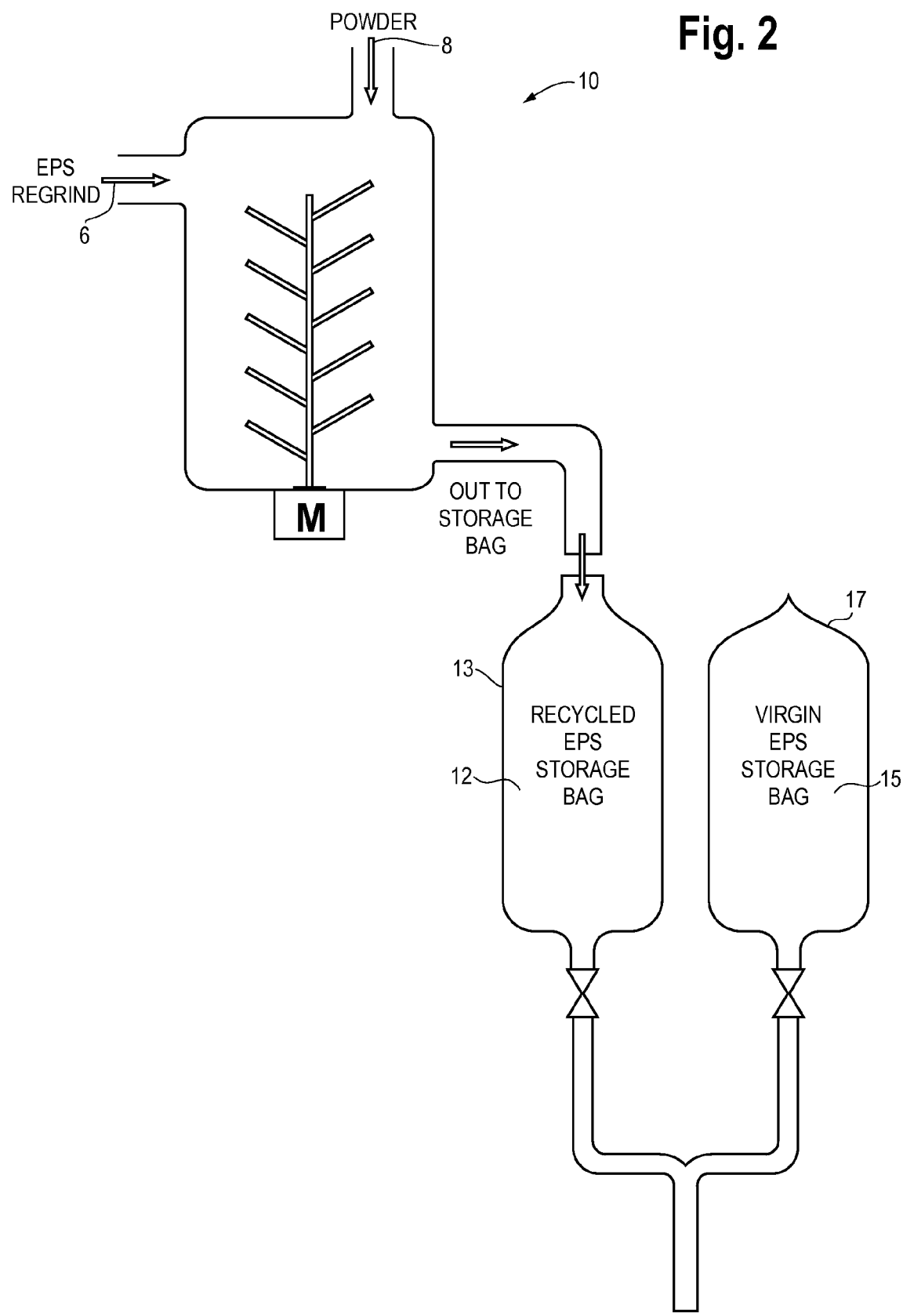

FIGS. 2 to 7 are diagrams of an apparatus for use with the present invention:

FIG. 2 shows the mixing step 100. About 95 wt % to about 99.9 wt % EPS regrind particles 6 and about 0.1 wt % to about 5 wt % (and preferably less than about 3.5 wt %) of a high static powder adhesive 8 are mixed, such as in a dry blend rotating mixer 10, to obtain adhesive coated EPS regrind particles 12. From about 0.1% to about 10% of optional additives may also be added to the mixture. The adhesive coated regrind particles 12 may be transferred to a storage tank 13 prior to being transferred to the mold 14. A similar storage tank 17 may be used to virgin EPS beads 15 for possible mixing with the adhesive coated regrind particles 12 prior to the filling step 102.

Figure 3:
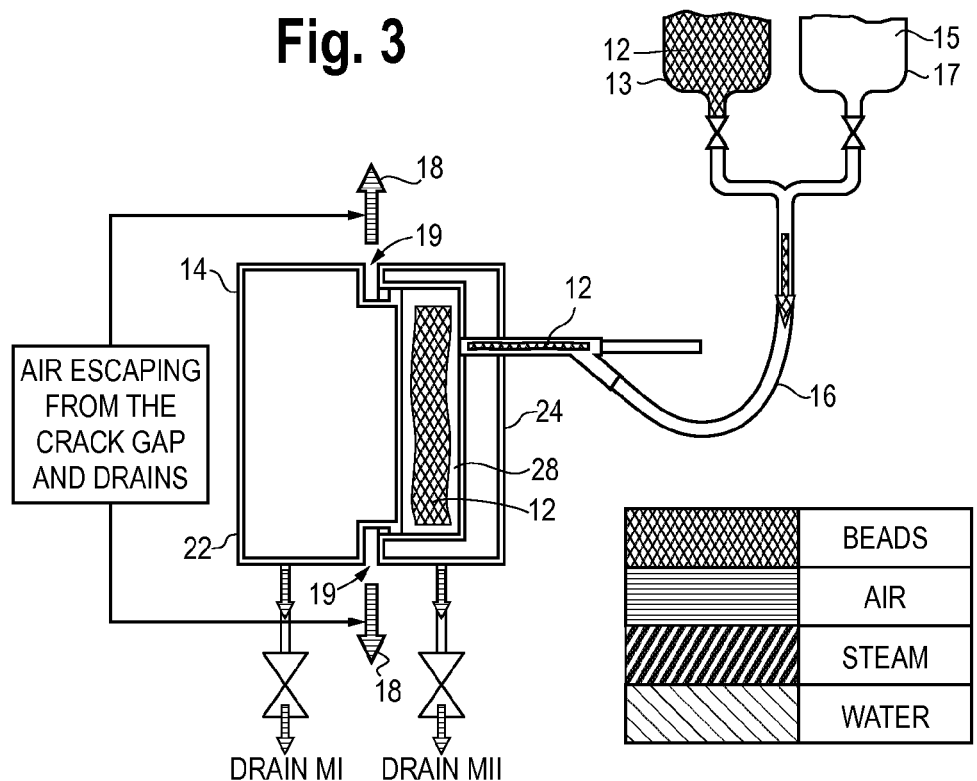

FIG. 3 shows the filling step 102. During the filling step 102, the adhesive-coated EPS regrind particles 12 are transferred to the mold 14, such as by using air from an air-pressurized fill gun. The mold 14 comprises a fixed (stationary) side 22 and a moving side 24 and defines a mold chamber 28. The particles 12 may be transferred to the mold chamber 28 via a convection pipe 16. As the particles 12 fill the mold 14, air 18 is displaced through air openings 19 in the mold 14. Various filling methods may be used as are known in the art, including but not limited to crack filling (in which the mold 14 is opened or "cracked") and compression filling (i.e., filling without cracking). During crack filling the mold 14 may be opened until the two halves 22, 24 of the mold 14 are about 0.5 to 5 mm apart. The air openings 19 allow air 18 to escape the mold 14 and provide some bead compression when the mold 14 closes, so that crack filling generally provide a more ideal filling than compression filling.

Figure 4:
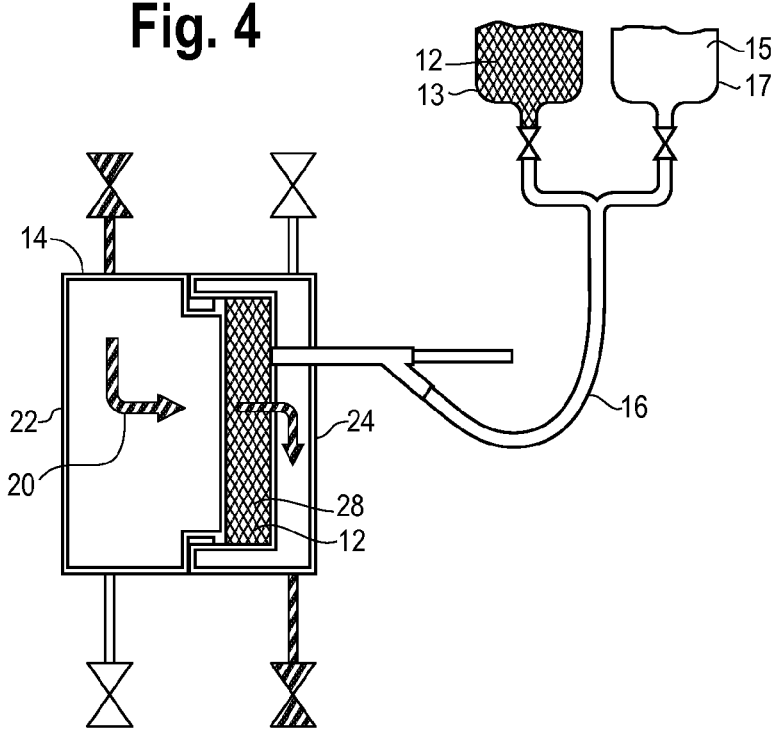
Figure 5:
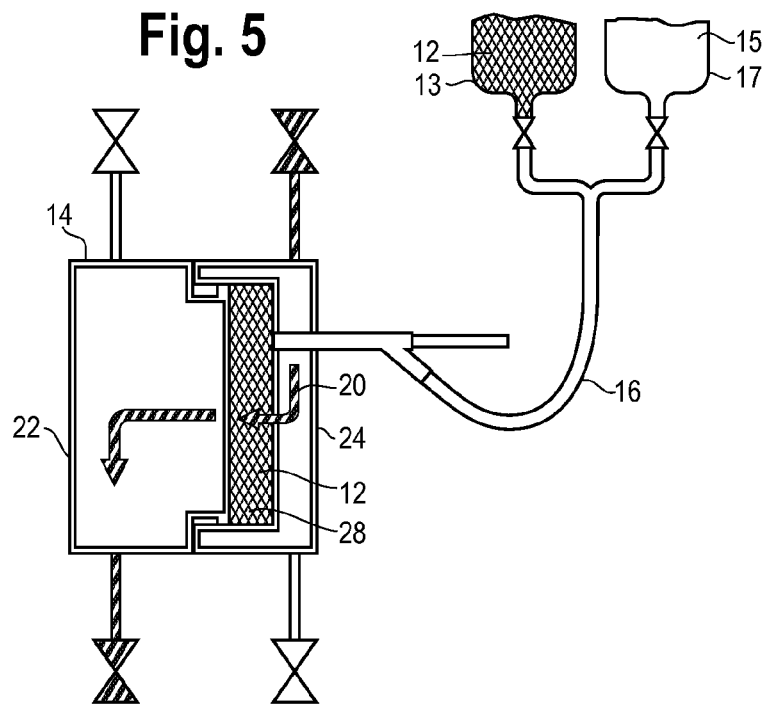

FIGS. 4 and 5 show the bonding step 104 during which the adhesive-coated regrind particles 12 are bonded together under pressure. During the bonding step 104 the mold 14 is completely closed and there are no air openings 19. A small quantity of pressurized steam 20 is introduced into the mold 14 and into the mold chamber 28 to raise the temperature of the powder adhesive above its melting point so that the powder adhesive melts to create bonded regrind particles. The mold temperature should be above about 60 degrees C. or even 70 degrees C. but below the melting point of EPS (about 120 degrees C.). In FIG. 4 the steam 18 is shown being introduced from the fixed side 22 of the mold 14. In FIG. 5 the steam 18 is shown being introduced from the moving side 24 of the mold 14.

Figure 6:
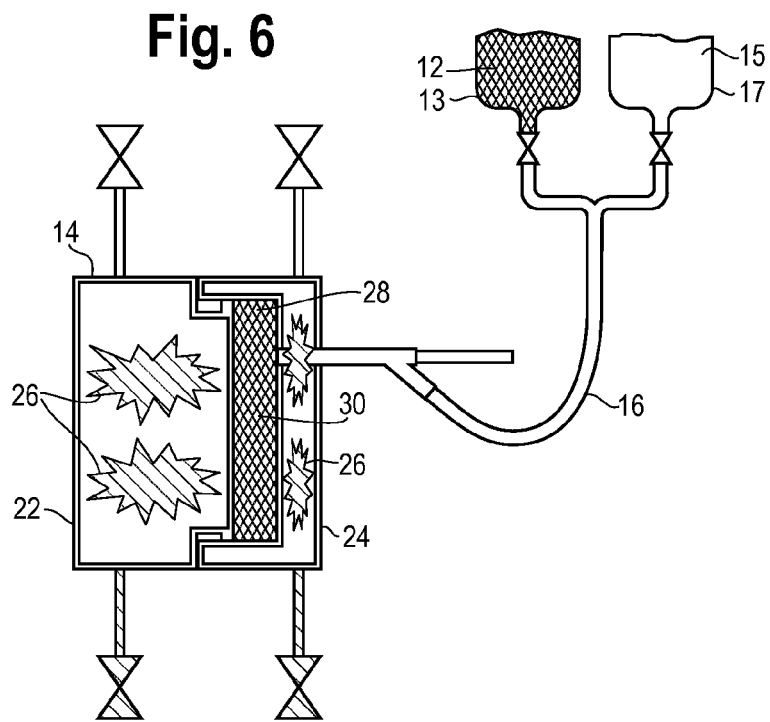

FIG. 6 shows the cooling step 106. During the cooling step 106, water 26 is introduced and may be circulated around the mold 14 for about two minutes to cool the now-bonded adhesive coated regrind particles 12, thereby producing a molded article 30 having a recycled EPS content of over 5% and up to 100%. After the cooling step air may be introduced into the mold 14 around the mold chamber 28 to purge any remaining cooling water 26 from the mold 14. Next, a vacuum may be pulled from the areas of water circulation around the mold chamber 28 to further eliminate any residual water 26.

FIG. 7 shows the ejection step 108. During the ejection step 108, the mold halves 22, 24 separate to allow the ejection of the molded article 30.

Benefits of the invention include:

(i) Environmental benefits: EPS is under tight scrutiny, as governmental agencies across the U.S. have passed legislation banning or reducing the use of EPS. Recycling EPS using the present invention reduces the amount of EPS that reaches landfills and that can potentially pollute water streams. Recycling EPS also reduces greenhouse gas emissions since recycling reduces the need for new polystyrene from petroleum based resources.

(ii) Reduced energy requirement: Since the adhesive additive provides the bead fusion, a much shorter steam cycle is needed, thereby reducing the energy needed to make recycled molded parts.

(iii) No expanding agent (such as pentane) required: Pentane is a highly volatile gas; each county in the United States has a restriction on how much emission plants are allowed. Using recycled beads avoids usage of pentane thus creating a positive impact on the environment.

(iv) No greenhouse gas emissions: The invention eliminates steps where pentane is injected into the EPS.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

EXAMPLES

|  | Tensile Stress @ Break (Pa) | Tensile Modulus (Mpa) | Tensile Strain @ Break (%) | Flexural Stress @ Break (MPa) | Flexural Modulus (Mpa) | Compressive Stress @ 50% Strain (Pa) |
| --- | --- | --- | --- | --- | --- | --- |
| Virgin EPS | 262,700 | 7.1 | 6.01 | 251,700 | 8.17 | 220,900 |
| EPS + 10% Recycle | 235,600 | 6.44 | 5.31 | 222,450 | 7.23 | 201,535 |
| EPS + 20% Recycle | 220,000 | 5.98 | 5.01 | 218,475 | 6.78 | 189,254 |
| EPS + 10% Recycle + Adhesive Powder | 278,600 | 8.38 | 5.36 | 298,500 | 10.84 | 242,900 |
| EPS + 20% Recycle + Adhesive Powder | 290,500 | 8.41 | 5.35 | 305,200 | 14.09 | 248,100 |

The table above shows a physical properties comparison between virgin EPS and EPS with different recycle loadings. Adding 10 wt % and 20 wt % recycled EPS to virgin EPS has a negative impact on physical properties. Tensile stress at break, flexural stress at break and compressive stress at 50% strain show a drop of 10% to 20%. These properties are critical to EPS for its optimum performance.

Adding adhesive powder according to the disclosure not only restores these properties but shows tremendous improvement. At 10 wt % recycle loading, tensile stress at break, flexural stress at break and compressive stress at 50% strain showed an improvement of 6%, 18% and 10% respectively compared to virgin EPS. For 20 wt % recycle loading the tensile stress at break, flexural stress at break and compressive stress at break showed an improvement of 10%, 21% and 12% respectively. The even greater improvement in 20% recycle samples likely is due to the higher percentage of adhesive powder. A positive impact on surface finish as recycle percentage increased was observed. The maximum amount of recycle usage will be dictated by individual applications and customer specifications.

The invention claimed is:

1. A method of making a molded article comprising the steps of:
   Step 100: mixing about 95 wt % to about 99.9 wt % expanded bead foam regrind particles with about 0.1 wt % to about 5 wt % of a high static powder adhesive in a dry blend rotating mixer to obtain adhesive coated expanded bead foam regrind particles;
   Step 102: transferring the adhesive-coated expanded bead foam regrind particles to a mold;
   Step 104: bonding together the adhesive-coated regrind particles under pressure by introducing a small quantity of pressurized steam into the mold to raise the temperature above the melting point of the powder adhesive but below the melting point of the expanded foam regrind particles to create bonded regrind particles; and
   Step 106: cooling the bonded regrind particles in the mold for about two minutes, thereby producing a molded article.

2. The method of claim 1 wherein:
the expanded bead foam regrind particles are made of expanded polystyrene or expanded polyethylene.

3. The method of claim 1 wherein:
the expanded bead foam regrind particles are made of expanded polystyrene.

4. The method of claim 1 wherein:
the temperature in step 104 is about 60 C or higher.

5. The method of claim 1 wherein:
the temperature in step 104 is about 70 C or higher.

6. The method of claim 1 wherein:
the concentration of adhesive in step 100 is less than about 3.5 wt %.

7. The method of claim 1 wherein:
the adhesive in step 100 is a thermographic powder.

8. The method of claim 1 wherein:
before step 102 the adhesive-coated expanded bead foam regrind particles are mixed with virgin expanded beads.

9. The method of claim 8 wherein:
the adhesive-coated expanded bead foam regrind particles are mixed with virgin expanded beads in a ratio of at least 5 wt % expanded bead foam regrind particles to at most 95 wt % virgin expanded beads.

10. The method of claim 8 wherein:
the adhesive-coated expanded bead foam regrind particles are mixed with virgin expanded beads in a ratio of at least 10 wt % adhesive coated expanded bead foam regrind particles to at most 90 wt % virgin expanded beads.

11. The method of claim 8 wherein:
the adhesive-coated expanded bead foam regrind particles are mixed with virgin expanded beads in a ratio of at least 20 wt % adhesive coated expanded bead foam regrind particles to at most 80 wt % virgin expanded beads.

12. The method of claim 1 wherein:
during step 102 the adhesive-coated expanded bead foam regrind particles are transferred using air from an air-pressurized fill gun.

13. The method of claim 1 wherein:
the cooling step 106 lasts about two minutes.

14. The method of claim 1 wherein:
during the cooling step 106 water is circulated around the mold.

15. The method of claim 14 wherein:
after the cooling step 106 air is introduced into the mold to purge any remaining cooling water from the mold.

16. The method of claim 15 wherein:
after air is introduced into the mold a vacuum is pulled from areas of water circulation around the mold to further eliminate the water.

* * * * *